(12) United States Patent
Paulchell et al.

(10) Patent No.: US 12,063,255 B2
(45) Date of Patent: Aug. 13, 2024

(54) SECURITY GROUP DIFFERENCING UTILITY TO ASSESS CHANGES AND ADOPTION RISKS

(71) Applicant: Capital One Services, LLC, McLean, VA (US)

(72) Inventors: Joseph T. Paulchell, Mechanicsville, VA (US); Mashour Rahman, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 121 days.

(21) Appl. No.: 17/568,022

(22) Filed: Jan. 4, 2022

(65) Prior Publication Data
US 2023/0216891 A1   Jul. 6, 2023

(51) Int. Cl.
*H04L 9/40*   (2022.01)
(52) U.S. Cl.
CPC .................................. *H04L 63/205* (2013.01)
(58) Field of Classification Search
CPC ... H04L 63/205; H04L 63/20; H04L 63/0227; H04L 63/0263; H04L 63/04; H04L 9/40
See application file for complete search history.

(56) References Cited

U.S. PATENT DOCUMENTS

| | | | |
|---|---|---|---|
| 10,721,275 B2 | 7/2020 | Kung et al. | |
| 10,984,112 B2 | 4/2021 | Agarwal | |
| 11,012,370 B1 | 5/2021 | Gladney | |
| 11,038,784 B2 | 6/2021 | Nickolov et al. | |
| 11,055,417 B2 | 7/2021 | Bhatia et al. | |
| 2007/0169195 A1* | 7/2007 | Anand | H04L 63/1416 726/23 |
| 2020/0007397 A1 | 1/2020 | Fainberg | |
| 2020/0137097 A1 | 4/2020 | Zimmermann et al. | |
| 2020/0244708 A1* | 7/2020 | Harvey | G06F 9/45558 |
| 2020/0356536 A1 | 11/2020 | Nilsson | |
| 2022/0191248 A1* | 6/2022 | Pieczul | H04L 63/0227 |

* cited by examiner

*Primary Examiner* — Quazi Farooqui
(74) *Attorney, Agent, or Firm* — Sterne, Kessler, Goldstein & Fox P.L.L.C.

(57) ABSTRACT

Embodiments disclosed are directed to a computing system that performs steps for providing security group differencing for applications stored in a cloud-based computing environment. The computing system receives a request to update an application stored in a cloud-based computing environment from a first version of the application to a second version of the application. The computing system identifies a first set of security group rules for the first version of the application and a second set of security group rules for the second version of the application. The computing system determines security group differencing data based on the first set of security group rules and the second set of security group rules. Subsequently, the computing system determines a security score based on the security group differencing data and provisions an adoption rule based on a comparison between the security score and a predetermined security score threshold.

19 Claims, 4 Drawing Sheets

SECURITY GROUP DIFFERENCING UTILITY TO ASSESS CHANGES AND ADOPTION RISKS

TECHNICAL FIELD

Embodiments relate to cloud computing, specifically a system that determines differences in network access rules consisting of protocol, port ranges, and internet protocol (IP) address block between two sets of rules for applications stored in a cloud-based computing environment.

BACKGROUND

Many cloud platforms, such as Amazon Web Services (AWS)™, use security groups to control the access allowed in and out of their servers. Applications can have many associated security groups and often have to adopt a newer version, change rules, or reconcile access rules between the current state and a desired or alternative state. However, these cloud platforms only provide, via a console such as AWS Console, a view of rules and related security groups with no utility to assess the impact of adding a new security group. In other words, these cloud platforms can only show current rules without a way to compare access between two different items. Accordingly, to determine all the changes that occurred between the baseline and the newer or alternate security group, a development team must manually assess, by hand or via a spreadsheet, the newer or alternative security group or simply adopt the security group and conduct tests in a pre-production environment. This can take significant time, absorbing hours of manual labor, and is still error prone, creating risks of loss of access and application outages. In addition, there are cases where the development team has deprecated a security group and other development teams that use the old security group must migrate. This can require significant time in analysis or testing to determine what access is needed based on the difference between current and new application versions.

SUMMARY

Provided herein are system, apparatus, article of manufacture, method and/or computer program product embodiments, and/or combinations and sub-combinations thereof, for providing security group differencing for applications stored in a cloud-based computing environment. The security group differencing techniques disclosed herein can determine differences in network access rules consisting of protocol, port ranges, and internet protocol (IP) address block between two sets of rules for applications stored in a cloud-based computing environment.

An example embodiment is directed to a computer-implemented method for providing security group differencing for applications stored in a cloud-based computing environment. The computer-implemented method can include receiving, by one or more computing devices, a request to update an application stored in a cloud-based computing environment from a first version of the application to a second version of the application. The computer-implemented method can further include identifying, by the one or more computing devices, a first set of security group rules for the first version of the application. The computer-implemented method can further include identifying, by the one or more computing devices, a second set of security group rules for the second version of the application. The computer-implemented method can further include determining, by the one or more computing devices, security group differencing data based on the first set of security group rules and the second set of security group rules. The computer-implemented method can further include determining, by the one or more computing devices, a security score based on the security group differencing data. The computer-implemented method can further include provisioning, by the one or more computing devices, an adoption rule based on a comparison between the security score and a predetermined security score threshold.

Another example embodiment is directed to a non-transitory computer readable medium including instructions for causing a processor to perform operations for providing security group differencing for applications stored in a cloud-based computing environment. The operations can include receiving a request to update an application stored in a cloud-based computing environment from a first version of the application to a second version of the application. The operations can further include identifying a first set of security group rules for the first version of the application. The operations can further include identifying a second set of security group rules for the second version of the application. The operations can further include determining security group differencing data based on the first set of security group rules and the second set of security group rules. The operations can further include determining a security score based on the security group differencing data. The operations can further include provisioning an adoption rule based on a comparison between the security score and a predetermined security score threshold.

Another example embodiment is directed to a computing system for providing security group differencing for applications stored in a cloud-based computing environment. The computing system can include a storage unit configured to store instructions. The computing system can further include a control unit coupled to the storage unit and configured to process the stored instructions to receive a request to update an application stored in a cloud-based computing environment from a first version of the application to a second version of the application. The control unit can be further configured to process the stored instructions to identify a first set of security group rules for the first version of the application. The control unit can be further configured to process the stored instructions to identify a second set of security group rules for the second version of the application. The control unit can be further configured to process the stored instructions to determine security group differencing data based on the first set of security group rules and the second set of security group rules. The control unit can be further configured to process the stored instructions to determine a security score based on the security group differencing data. The control unit can be further configured to process the stored instructions to provision an adoption rule based on a comparison between the security score and a predetermined security score threshold.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art to make and use the embodiments.

DETAILED DESCRIPTION

Figure 1:
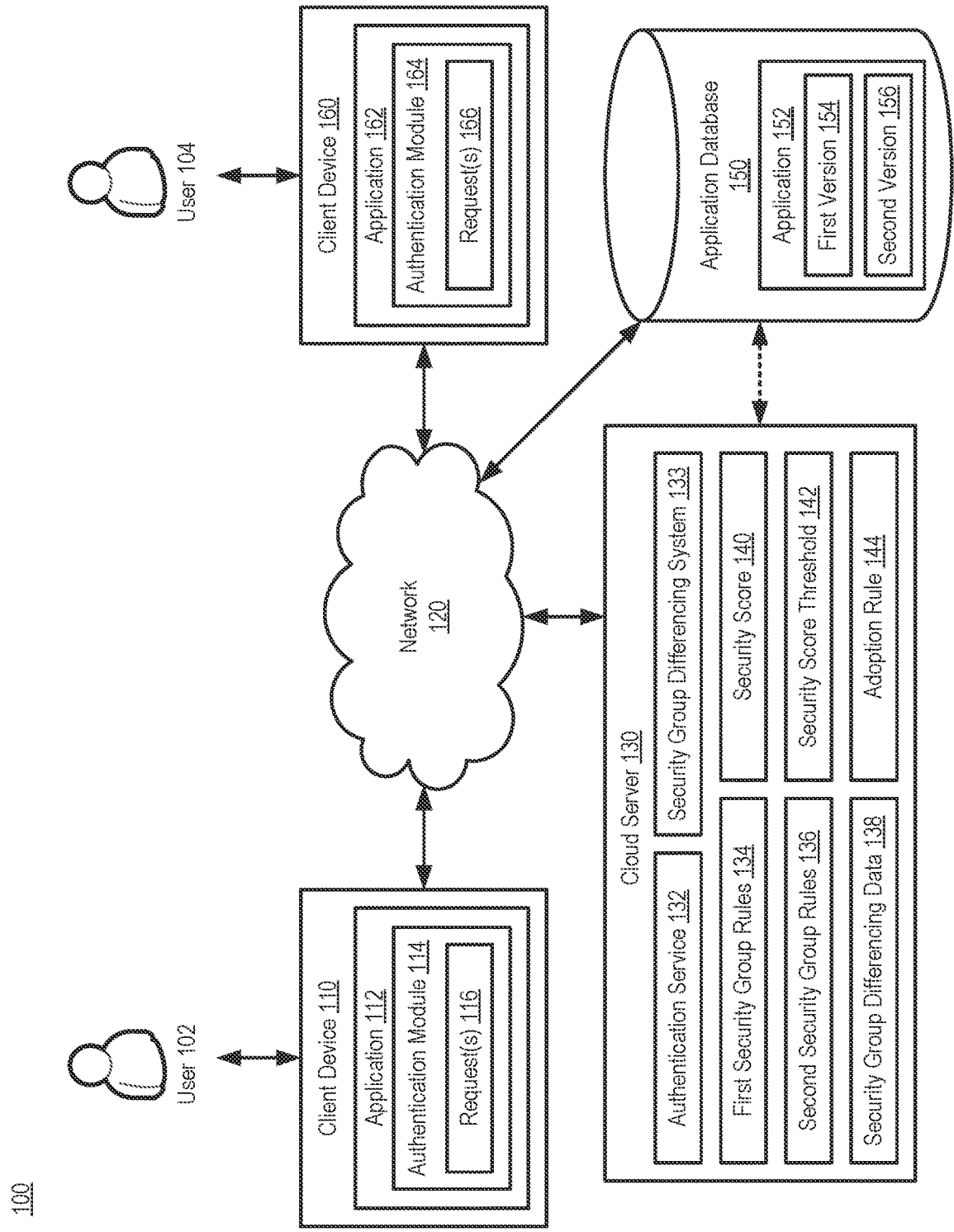
FIG. 1 is an example system for providing security group differencing for applications stored in a cloud-based computing environment, according to some embodiments.

Provided herein are system, apparatus, article of manufacture, method and/or computer program product embodiments, and/or combinations and sub-combinations thereof, for determining differences in network access rules consisting of protocol, port ranges, and IP address block between two sets of rules for applications stored in a cloud-based computing environment, referred to herein as "security group differencing." The systems and methods disclosed herein may achieve security group differencing by performing a comprehensive analysis between two different security groups to determine all the changes that occurred between the baseline and the newer or alternate security group.

As a non-limiting example, software development teams can face challenges maintaining their application security groups to ensure least access and stay compliant with cloud controls. Security groups and their rules can be complex. For example, port ranges, network protocol, IP address blocks (e.g., classless inter-domain routing (CIDR) blocks), and individual rules in security groups can overlap. Further, there is limited tooling to aid in this analysis. For example, AWS Console is difficult to view, use, and export. In another example, OpsInsight does not expose rule-level information, only the version of the standard groups. There is no easy way to determine the effect of changes, and it is difficult to identify missing access. Consequentially, development teams often lag on adopting periodic changes embodied in the access rules, resulting in ongoing compliance gaps. Security groups can be deprecated, such as those utilized in an information security risk management (ISRM) database, and applications must determine differences between their security groups and the lost rules. There is also a need for ongoing security group maintenance for application migration or other change cases.

Described herein are method, system, device, and computer readable medium embodiments for providing security group differencing for applications stored in a cloud-based computing environment. In several embodiments, the embodiments disclosed herein can include a security group differencing system (e.g., a software utility) that analyzes and identifies the changes in access between two security groups. In several embodiments, the security group differencing system automates the complexity of identifying changes in the access between any two security groups. For example, the security group differencing system determines what access has been removed from the baseline and determines what access has been added. The security group differencing system can compare any two security groups in the same account, in the same region, or in two different regions, and can be extended to compare across accounts.

In several embodiments, the security group differencing system can perform a comprehensive analysis across all rules in the entire security group, rather than rule by rule. For example, the security group differencing system can identify security group rules by identifying both the outbound (egress) and inbound (ingress) access, port ranges to each destination and from each source, and source and destination IP address blocks. The security group differencing system then can determine security group differencing data by detecting, for example, widening or contracting IP address blocks in the identified security group rules, even in the middle of an IP address range.

In several embodiments, the security group differencing system can determine security group differencing data by detecting, for example, egress changes (e.g., new destinations and removed outbound access), ingress changes (e.g., new sources and removed inbound access), port changes (e.g., added ports, removed ports, and combinations thereof), and IP range changes (e.g., adding, removing, expanding, or contracting CIDR ranges). For example, a first version of an application may include the first security group "tcp 8080-8090 to [10.20.0.0/24]," a second version of the application may include the second security group "tcp 8088-8100 to [10.20.0.0/24]," and the security group differencing system can identify that the second security group removed [8080-8087] and added [8091-8100] to the destination. In another example, a first version of an application may include the first security group "tcp 8080 [10.20.0.0/22]," a second version of the application may include the second security group "tcp 8080 [10.20.0.0/24]," and the security group differencing system can identify that the second security group changed the size of the IP address range by 768 IP addresses.

In several embodiments, the security group differencing system can be a stand-alone command line system that can utilize a command (e.g., "python3 sg-diff.py [From Security-Group-ID] [To Security-Group-ID]") to generate a security group difference report showing the access changes between two different security groups. Additionally or alternatively, in several embodiments, the security group differencing system can be extensible to a serverless AWS Lambda capability to support further automation. In several embodiments, the security group differencing system uses AWS account access via an AWS token stored in a configurable location or in any other suitable way.

In several embodiments, the security group differencing system can utilize automation to automatically detect newly-deployed security groups and automatically trigger security group rehydrations. For example, the security group differencing system can generate no risk updates when only new access added or if access was removed but never used (e.g., based on an automated analysis of virtual private cloud (VPC) flow logs). In another example, the security group differencing system can notify owners and provide security group difference report. In yet another example, the security group differencing system can integrate with a code-scanning tool that identifies and updates code repositories to ensure environment provisioning code is up to date providing additional functionality.

In several embodiments, the security group differencing system can take any two security groups (e.g., AWS security groups) and perform a comprehensive comparison between them to identify and report on all the changes in access between the baseline version and the other security group. In several embodiments, the security group differencing system can identify every access change including, but not limited to, adding ports, removing ports, adding or removing IP address ranges, expansion or contraction of access, and the size of the IP address change.

In several embodiments, the security group differencing system can be implemented in Python or any other suitable software language. In several embodiments, the security group differencing system can generate a security group difference report from any two input security groups in the same account and can be generalized to compare across accounts. In several embodiments, the security group differencing system can also be triggered from serverless AWS Lambda to produce a security group difference report (e.g., every quarter) for every asset between a current version and a newer deployed version of a security group. This automation can even be used to score the risk of change and when there is little or no risk (e.g., access has only been added; only unused access has been removed; etc.), automate the upgrade to the newer version, significantly reducing developer toil and speeding adoption of new rules. In several embodiments, the security group differencing system can also help the development team to determine rules needed when an application of shared security groups is deprecated.

In several embodiments, the security group differencing system can be run from the command line or automated to produce and output a security group difference report. In automated embodiments, the automation steps can include: (i) identifying new security group deployments in an account; (ii) running the security group differencing system on every asset in the account (e.g., using their current state as baseline) and the new security group; (iii) storing the security group difference report in a data repository (e.g., in an AWS S3 bucket); and (iv) processing the security group difference report to real-time swap the new security group for the old security group, or to notify (e.g., via email) application owners or create upgrade issues (e.g., in Atlassian Jira™) to do so manually. As a result, the security group differencing system can expose changes in security group access and also enable an assessment of the risk of adopting new rules, reducing developer toil and hours spent in analysis.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "security group (SG)" referred to herein can include a named set of allowed inbound and/or outbound network connections for an instance. Each security group can consist of a list of protocols, ports, IP address ranges, any other suitable electronic information, or any combination thereof. A security group can apply to multiple instances, and multiple groups can regulate a single instance.

The term "module" or "unit" referred to herein can include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claim section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in embodiments of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, units, or services in the following description of the embodiments may be coupled to one another as described or as shown. The coupling may be direct or indirect, without or with intervening items between coupled modules, units, or services. The coupling may be by physical contact or by communication between modules, units, or services.

System Overview and Function

FIG. 1 is an example system 100 for providing security group differencing for applications stored in a cloud-based computing environment, according to some embodiments. In several embodiments, system 100 can include a client device 110 associated with a user 102, a client device 160 associated with a user 104, a network 120, a cloud server 130, and an application database 150. In several embodiments, the client device 110 can further include an application 112 which, in several embodiments, includes an authentication module 114 having access to a plurality of device attributes stored on, or in association with, the client device 110. In several embodiments, the client device 160 can further include an application 162 which, in several embodiments, includes an authentication module 164 having access to a plurality of device attributes stored on, or in association with, the client device 160. In several embodiments, the cloud server 130 can further include an authentication service 132 and a security group differencing system 133.

The client device 110 and the client device 160 can be any of a variety of centralized or decentralized computing devices. For example, one or both of the client device 110 and the client device 160 can be a mobile device, a laptop computer, a desktop computer, or a point-of-sale (POS) device. In several embodiments, one or both of the client device 110 and the client device 160 can function as a stand-alone device separate from other devices of the system 100. The term "stand-alone" can refer to a device being able to work and operate independently of other devices. In several embodiments, the client device 110 and the client device 160 can store and execute the application 112 and the application 162, respectively.

Each of the application 112 and the application 162 can refer to a discrete software that provides some specific functionality. For example, the application 112 can be a mobile application that the user 102 can utilize to perform some functionality, whereas the application 162 can be a mobile application that the user 104 can utilize to perform some functionality. For example and without limitation, the user 102, the user 104, or both can utilize the functionality to perform banking, data transfers, or commercial transactions. In other embodiments, one or more of the application 112 and the application 162 can be a desktop application that the user 102 or the user 104 can utilize to perform the functionalities described herein.

In several embodiments, the client device 110 and the client device 160 can be coupled to the cloud server 130 via a network 120. The cloud server 130 can be part of a backend computing infrastructure, including a server infrastructure of a company or institution, to which the application 112 and the application 162 belong. While the cloud server 130 is described and shown as a single component in FIG. 1, this is merely an example. In some embodiments, the cloud server 130 can comprise a variety of centralized or decentralized computing devices. For example, the cloud server 130 can include a mobile device, a laptop computer, a desktop computer, grid-computing resources, a virtualized computing resource, cloud-computing resources, peer-to-peer distributed computing devices, a server farm, or a combination thereof. The cloud server 130 can be centralized in a single room, distributed across different rooms, distributed across different geographical locations, or embedded within the network 120. While the devices comprising the cloud server 130 can couple with the network 120 to communicate with the client device 110 and the client device 160, the devices of the cloud server 130 can also function as stand-alone devices separate from other devices of the system 100.

In several embodiments, if the cloud server 130 can be implemented using cloud computing resources of a public or private cloud. Examples of a public cloud include, without limitation, Amazon Web Services (AWS)™, IBM Cloud™, Oracle Cloud Solutions™ Microsoft Azure Cloud™, and Google Cloud™. A private cloud refers to a cloud environment similar to a public cloud with the exception that it is operated solely for a single organization.

In several embodiments, the cloud server 130 can couple to the client device 110 to allow the application 112 to function. For example, in several embodiments, both the client device 110 and the cloud server 130 can have at least a portion of the application 112 installed thereon as instructions on a non-transitory computer readable medium. The client device 110 and the cloud server 130 can both execute portions of the application 112 using client-server architectures, to allow the application 112 to function.

In several embodiments, the cloud server 130 can couple to the client device 160 to allow the application 162 to function. For example, in several embodiments, both the client device 160 and the cloud server 130 can have at least a portion of the application 162 installed thereon as instructions on a non-transitory computer readable medium. The client device 160 and the cloud server 130 can both execute portions of the application 162 using client-server architectures, to allow the application 162 to function.

In several embodiments, the cloud server 130 can transmit requests and other data to, and receive requests, indications, device attributes, and other data from, the authentication module 114 and the authentication module 164 (and in effect the client device 110 and the client device 160, respectively) via the network 120. The network 120 can be a telecommunications network, such as a wired or wireless network. The network 120 can span and represent a variety of networks and network topologies. For example, the network 120 can include wireless communications, wired communications, optical communications, ultrasonic communications, or a combination thereof. For example, satellite communications, cellular communications, Bluetooth, Infrared Data Association standard (IrDA), wireless fidelity (Wi-Fi), and worldwide interoperability for microwave access (WiMAX) are examples of wireless communications that can be included in the network 120. Cable, Ethernet, digital subscriber line (DSL), fiber optic lines, fiber to the home (FTTH), and plain old telephone service (POTS) are examples of wired communications that can be included in the network 120. Further, the network 120 can traverse a number of topologies and distances. For example, the network 120 can include a direct connection, personal area network (PAN), local area network (LAN), metropolitan area network (MAN), wide area network (WAN), or a combination thereof. For illustrative purposes, in the embodiment of FIG. 1, the system 100 is shown with the client device 110, the client device 160, and the cloud server 130 as end points of the network 120. This, however, is an example and it is to be understood that the system 100 can have a different partition between the client device 110, the client device 160, the cloud server 130, and the network 120. For example, the client device 110, the client device 160, and the cloud server 130 can also function as part of the network 120.

In several embodiments, the client device 110 and the client device 160 can include at least the authentication module 114 and the authentication module 164, respectively. In several embodiments, each of the authentication module 114 and the authentication module 164 can be a module of the application 112 and the application 162, respectively. In several embodiments, the authentication module 114 and the authentication module 164 can enable the client device 110 and the client device 160, respectively, and/or the application 112 and the application 162, respectively, to receive requests and other data from, and transmit requests, device attributes, indications, and other data to, the authentication service 132 and/or the cloud server 130 via the network 120. In several embodiments, this can be done by having the authentication module 114 and the authentication module 164 couple to the authentication service 132 via an API to transmit and receive data as a variable or parameter.

In several embodiments, the cloud server 130 can include at least the authentication service 132 and the security group differencing system 133. In several embodiments, each of the authentication service 132 and the security group differencing system 133 can be implemented as a software application on the cloud server 130. In several embodiments, the authentication service 132 can enable receipt of electronic information (e.g., device attributes, online account properties) from the authentication module 114 and the authentication module 164. This can be done, for example, by having the authentication service 132 couple to the authentication module 114 and the authentication module 164 via a respective API to receive the electronic information as a variable or parameter. In several embodiments, the authentication service 132 and the security group differencing system 133 can further enable storage of the electronic information in a local storage device or transmission (e.g., directly, or indirectly via the network 120) of the electronic information to the application database 150 for storage and retrieval.

The application database 150 can be a database or repository used to store applications, such as an application 152, and different versions thereof, including, but not limited to, a first version 154 of the application 152, a second version 156 of the application 152, any other suitable data, or any combination thereof.

In a variety of embodiments, the authentication service 132 of the cloud server 130 can provide for authenticating a client device 110 that is attempting to update the application 152 from the first version 154 to the second version 156.

In various embodiments, the security group differencing system 133 can receive, from the client device 110, a request 116 to update an application 152 stored in the application database 150 from a first version 154 of the application 152 to a second version 156 of the application 152. The security group differencing system 133 can process the first version 154 of the application 152 to identify a first set of security group rules 134 included in the first version 154 of the application 152. The security group differencing system 133 can further process the second version 156 of the application 152 to identify a second set of security group rules 136 included in the second version 156 of the application 152. Subsequently, the security group differencing system 133 can compare the second set of security group rules 136 to the first set of security group rules 134 to determine if any security concerns should prohibit adoption of one or more security group rules in the second set of security group rules 136.

In several embodiments, the security group differencing system 133 can determine security group differencing data 138 based on the first set of security group rules and the second set of security group rules. The security group differencing data 138 can include electronic information indicative of the access changed between the first version 154 of the application 152 and the second version 156 of the application 152, including, but not limited to, the ports added, the ports removed, the IP address ranges added, the IP address ranges removed, the expansion of access, the contraction of access, the size of the IP address change, any other suitable electronic information, or any combination thereof.

In several embodiments, the security group differencing system 133 can identify a set of common security group rules included in both the first version 154 of the application 152 and the second version 156 of the application 152. The security group differencing system 133 can generate a modified first set of security group rules by removing the set of common security group rules from the first set of security group rules 134. The security group differencing system 133 can generate a modified second set of security group rules by removing the set of common security group rules from the second set of security group rules 136. The security group differencing system 133 can determine the security group differencing data 138 based on the modified first set of security group rules and the modified second set of security group rules.

In several embodiments, the security group differencing system 133 can generate, based on the security group differencing data 138, a security group difference report showing the access changed between different versions of an application.

In one example, the security group differencing system 133 can generate, based on the security group differencing data 138, an example security group difference report showing the access changed when upgrading an enterprise application from a first version "source_name_1" to a second version "source_name_2" as provided below:

| Security Group Difference Report | | | | | |
|---|---|---|---|---|---|
| From SG: <source_name_1> [<source_unique_id_1>/<cloud_region_1>/<account_number_1>] | | | | | |
| To SG: <source_name_2> [<source_unique_id_2>/<cloud_region_2>/<account_number_2>] | | | | | |
| Ingress Removed: | | | | | |
| Protocol | Ports | IP Range Start-IP Range End | # of IPs | IP Range Summary | |
| Ingress Added: | | | | | |
| Protocol | Ports | IP Range Start-IP Range End | # of IPs | IP Range Summary | |
| tcp | [27101] | 10.95.139.0-10.95.139.127 | (+128) | ['10.95.139.0/25'] | |
| tcp | [27401] | 10.95.139.0-10.95.139.127 | (+128) | ['10.95.139.0/25'] | |
| tcp | [27101] | 10.185.139.0-10.185.139.255 | (+256) | ['10.185.139.0/24'] | |
| tcp | [27401] | 10.185.139.0-10.185.139.255 | (+256) | ['10.185.139.0/24'] | |
| tcp | [27101] | 10.185.144.0-10.185.144.127 | (+128) | ['10.185.144.0/25'] | |
| tcp | [27401] | 10.185.144.0-10.185.144.127 | (+128) | ['10.185.144.0/25'] | |
| Egress Removed: | | | | | |
| Protocol | Ports | IP Range Start-IP Range End | # of IPs | IP Range Summary | |
| Egress Added: | | | | | |
| Protocol | Ports | IP Range Start-IP Range End | # of IPs | IP Range Summary | |

In another example, the security group differencing system 133 can generate, based on the security group differencing data 138, a security group difference report in the opposite direction, going from the version "20.02" backwards to the version "20.01" of the application. As a result, the changes included in the "Ingress Added" and "Egress Added" sections of the example security group difference report provided above instead would be included in the "Ingress Removed" and "Egress Removed" sections, respectively. Likewise, the changes included in the "Ingress Removed" and "Egress Removed" sections of the above text instead would be included in the "Ingress Added" and "Egress Added" sections, respectively.

In yet another example, the security group differencing system 133 can generate, based on the security group differencing data 138, an example security group difference report showing the access changed when upgrading the enterprise application from a third version "source_name_3" to a fourth version "source_name_4" as provided below:

| Security Group Difference Report |
| --- |

From SG: <source_name_3> [<source_unique_id_3>/<cloud_region_3>/<account_number_3>]
To SG: <source_name_4> [<source_unique_id_4>/<cloud_region_4>/<account_number_4>]
Ingress Removed:

| Protocol | Ports | IP Range Start-IP Range End | # of IPs | IP Range Summary |
| --- | --- | --- | --- | --- |
| tcp | [4445] | 10.14.50.36-10.14.50.36 | (−1) | ['10.14.50.36/32'] |

Ingress Added:

| Protocol | Ports | IP Range Start-IP Range End | # of IPs | IP Range Summary |
| --- | --- | --- | --- | --- |
| tcp | [4445-4446] | 10.103.130.37-10.103.130.38 | (+2) | ['10.103.130.37/32', '10.103.130.38/32'] |

Egress Removed:

| Protocol | Ports | IP Range Start-IP Range End | # of IPs | IP Range Summary |
| --- | --- | --- | --- | --- |

Egress Added:

| Protocol | Ports | IP Range Start-IP Range End | # of IPs | IP Range Summary |
| --- | --- | --- | --- | --- |

In yet another example, the security group differencing system 133 can generate, based on the security group differencing data 138, an example security group difference report showing the access changed when upgrading the enterprise application from the fourth version "source_name_4" to a fifth version "source_name_5" as provided below:

| Security Group Difference Report |
| --- |

From SG: <source_name_4> [<source_unique_id_4>/<cloud_region_4>/<account_number_4>]
To SG: <source_name_5> [<source_unique_id_5>/<cloud_region_5>/<account_number_5>]
Ingress Removed:

| Protocol | Ports | IP Range Start-IP Range End | # of IPs | IP Range Summary |
| --- | --- | --- | --- | --- |

Ingress Added:

| Protocol | Ports | IP Range Start-IP Range End | # of IPs | IP Range Summary |
| --- | --- | --- | --- | --- |
| tcp | [4041] | 10.152.229.0-10.152.229.127 | (+128) | ['10.152.229.0/25'] |
| tcp | [4041] | 10.159.46.128-10.159.46.255 | (+128) | ['10.159.46.128/25'] |

Egress Removed:

| Protocol | Ports | IP Range Start-IP Range End | # of IPs | IP Range Summary |
| --- | --- | --- | --- | --- |

Egress Added:

| Protocol | Ports | IP Range Start-IP Range End | # of IPs | IP Range Summary |
| --- | --- | --- | --- | --- |
| tcp | [443] | 10.213.192.0-10.213.195.255 | (+1024) | ['10.213.192.0/22'] |
| tcp | [4041] | 10.152.229.0-10.152.229.127 | (+128) | ['10.152.229.0/25'] |
| tcp | [4041] | 10.159.46.128-10.159.46.255 | (+128) | ['10.159.46.128/25'] |

In yet another example, the security group differencing system 133 can generate, based on the security group differencing data 138, an example security group difference report showing the access changed between the third version "source_name_3" and the fifth version "source_name_5" of the enterprise application as provided below:

| Security Group Difference Report |
| --- |

From SG: <source_name_3> [<source_unique_id_3>/<cloud_region_3>/<account_number_3>]
To SG: <source_name_5> [<source_unique_id_5>/<cloud_region_5>/<account_number_5>]
Ingress Removed:

| Protocol | Ports | IP Range Start-IP Range End | # of IPs | IP Range Summary |
| --- | --- | --- | --- | --- |
| tcp | [4445] | 10.14.50.36-10.14.50.36 | (−1) | ['10.14.50.36/32'] |

Ingress Added:

| Protocol | Ports | IP Range Start-IP Range End | # of IPs | IP Range Summary |
| --- | --- | --- | --- | --- |
| tcp | [4445-4446] | 10.103.130.37-10.103.130.38 | (+2) | ['10.103.130.37/32', '10.103.130.38/32'] |
| tcp | [4041] | 10.152.229.0-10.152.229.127 | (+128) | ['10.152.229.0/25'] |
| tcp | [4041] | 10.159.46.128-10.159.46.255 | (+128) | ['10.159.46.128/25'] |

-continued

| Security Group Difference Report | | | | |
|---|---|---|---|---|
| Egress Removed: | | | | |
| Protocol Ports | IP Range Start-IP Range End | # of IPs | IP Range Summary | |
| Egress Added: | | | | |
| Protocol Ports | IP Range Start-IP Range End | # of IPs | IP Range Summary | |
| tcp [443] | 10.213.192.0-10.213.195.255 | (+1024) | ['10.213.192.0/22'] | |
| tcp [4041] | 10.152.229.0-10.152.229.127 | (+128) | ['10.152.229.0/25'] | |
| tcp [4041] | 10.159.46.128-10.159.46.255 | (+128) | ['10.159.46.128/25'] | |

In still another example, the security group differencing system 133 can generate, based on the security group differencing data 138, an example security group difference report showing the access changed when upgrading a services application from a first version "source_name_11.08" to a second version "source_name_11.10" as provided below:

| Security Group Difference Report | | | | |
|---|---|---|---|---|
| From SG: <source_name_11.08> [<source_unique_id_11.08>/<cloud_region_11.08>/<account_number_11.08>] | | | | |
| To SG: <source_name_11.10> [<source_unique_id_11.10>/<cloud_region_11.10>/<account_number_11.10>] | | | | |
| Ingress Removed: | | | | |
| Protocol | Ports | IP Range Start-IP Range End | # of IPs | IP Range Summary |
| tcp | [443] | 10.34.166.0-10.34.167.127 | (−384) | ['10.34.166.0/24', '10.34.167.0/25'] |
| tcp | [443] | 10.97.102.0-10.97.103.127 | (−384) | ['10.97.102.0/24', '10.97.103.0/25'] |
| Ingress Added: | | | | |
| Protocol | Ports | IP Range Start-IP Range End | # of IPs | IP Range Summary |
| tcp | [443] | 10.23.32.0-10.23.43.255 | (+3072) | ['10.23.32.0/21', '10.23.40.0/22'] |
| tcp | [443] | 10.23.48.0-10.23.53.255 | (+1536) | ['10.23.48.0/22', '10.23.52.0/23'] |
| tcp | [443] | 10.106.32.0-10.106.43.255 | (+3072) | ['10.106.32.0/21', '10.106.40.0/22'] |
| tcp | [443] | 10.106.48.0-10.106.53.255 | (+1536) | ['10.106.48.0/22', '10.106.52.0/23'] |
| Egress Removed: | | | | |
| Protocol | Ports | IP Range Start-IP Range End | # of IPs | IP Range Summary |
| tcp | [8080-8085] | 10.47.12.0-10.47.31.255 | (−5120) | ['10.47.12.0/22', '10.47.16.0/20'] |
| tcp | [8080-8085] | 10.97.236.0-10.97.255.255 | (−5120) | ['10.97.236.0/22', '10.97.240.0/20'] |
| tcp | [443] | 10.187.164.0-10.187.166.255 | (−768) | ['10.187.164.0/23', '10.187.166.0/24'] |
| tcp | [443] | 10.207.144.0-10.207.155.255 | (−3072) | ['10.207.144.0/21', '10.207.152.0/22'] |
| Egress Added: | | | | |
| Protocol | Ports | IP Range Start-IP Range End | # of IPs | IP Range Summary |
| tcp | [443] | 10.23.32.0-10.23.43.255 | (+3072) | ['10.23.32.0/21', '10.23.40.0/22'] |
| tcp | [4431] | 10.23.61.0-10.23.61.191 | (+192) | ['10.23.61.0/25', '10.23.61.128/26'] |
| tcp | [443] | 10.106.32.0-10.106.43.255 | (+3072) | ['10.106.32.0/21', '10.106.40.0/22'] |
| tcp | [443] | 10.106.61.0-10.106.61.191 | (+192) | ['10.106.61.0/25', '10.106.61.128 |

In still another example, the security group differencing system 133 can generate, based on the security group differencing data 138, an example security group difference report showing the access changed when upgrading the services application from a third version "source_name_14.01" to a fourth version "source_name_14.03" as provided below:

| Security Group Difference Report | | | | |
|---|---|---|---|---|
| From SG: <source_name_14.01> [<source_unique_id_14.01>/<cloud_region_14.01>/<account_number_14.01>] | | | | |
| To SG: <source_name_14.03> [<source_unique_id_14.03>/<cloud_region_14.03>/<account_number_14.03>] | | | | |
| Ingress Removed: | | | | |
| Protocol | Ports | IP Range Start-IP Range End | # of IPs | IP Range Summary |
| Ingress Added: | | | | |
| Protocol | Ports | IP Range Start-IP Range End | # of IPs | IP Range Summary |
| Egress Removed: | | | | |
| Protocol | Ports | IP Range Start-IP Range End | # of IPs | IP Range Summary |
| Egress Added: | | | | |
| Protocol | Ports | IP Range Start-IP Range End | # of IPs | IP Range Summary |
| tcp | [443] | 10.4.0.0-10.4.3.255 | (+1024) | ['10.4.0.0/22'] |

In several embodiments, the security group differencing system 133 then can determine a security score 140 based on the security group differencing data 138. The security score 140 can include, for example, a numerical value (e.g., between 0 and 100, between 0.0 and 1.0, etc.) indicative of the risk of the ingress removed, the ingress added, the egress removed, the egress added, or a combination thereof. For example, when no access (e.g., ingress, egress, or both) has been removed or added, the security score 140 can include a numerical value of 1.0 on a scale of 1.0 indicating that there is substantially no risk in upgrading the application 152 from the first version 154 to the second version 156. In another example, when only access (e.g., ingress, egress, or both) has been added, or only access (e.g., ingress, egress, or both) that has not used within a predetermined amount of time (e.g., 30 days or since the release of the first version 154 of the application 152) has been removed, the security score 140 can include a numerical value of 0.7 on a scale of 1.0 indicating that there is substantially little risk in upgrading the application 152 from the first version 154 to the second version 156. In yet another example, when access (e.g., ingress, egress, or both) that has been used within a predetermined amount of time (e.g., 30 days or since the release of the first version 154 of the application 152) has been removed, the security score 140 can include a numerical value of 0.3 on a scale of 1.0 indicating that there is substantially great risk in upgrading the application 152 from the first version 154 to the second version 156.

In several embodiments, the security group differencing system 133 can provision an adoption rule 144 based on a comparison between the security score 140 and a predetermined security score threshold 142. For example, the security group differencing system 133 can provision the adoption rule 144 when the security score 140 (e.g., 1.0, 0.7) exceeds the predetermined security score threshold 142 (0.5). In another example, the security group differencing system 133 can determine not to provision the adoption rule 144 when the security score 140 (e.g., 0.3) does not exceed the predetermined security score threshold 142 (e.g., 0.5). The security group differencing system 133 can provision the adoption rule 144 according to the techniques disclosed herein or combinations thereof.

In several embodiments, the security group differencing system 133 can determine whether the security score 140 exceeds the predetermined security score threshold 142. In response to determining that the security score 140 exceeds the predetermined security score threshold 142, the security group differencing system 133 can provision the adoption rule 144 to adopt the second set of security group rules 136 in the second version 156 of the application 152. Alternatively, in response to determining that the security score 140 does not exceed the predetermined security score threshold 142, the security group differencing system 133 can provision the adoption rule 144 to block the second set of security group rules 136 in the second version 156 of the application 152. In one example, the security group differencing system 133 can provision the adoption rule 144 to block the second set of security group rules 136 by deleting the second set of security group rules 136 from the second version 156 of the application 152. In another example, the security group differencing system 133 can provision the adoption rule 144 to block the second set of security group rules 136 by disabling, or otherwise rendering inert, the second set of security group rules 136 in the second version 156 of the application 152. The security group differencing system 133 can provision the adoption rule 144 to disable the second set of security group rules 136 by, for example, surrounding each of the second set of security group rules 136 with comment-start and comment-stop characters (e.g., //, /*, */, #, etc.) to prevent the second set of security group rules 136 from being compiled or interpreted during execution of the second version 156 of the application 152.

In several embodiments, the security group differencing system 133 can provision the adoption rule 144 to adopt the first set of security group rules 134 in the second version 156 of the application 152. For example, the security group differencing system 133 can provision the adoption rule 144 to adopt the first set of security group rules 134 in the second version 156 of the application 152 by replacing the blocked second set of security group rules 136 in the second version 156 of the application 152 with the first set of security group rules 134. In another example, the security group differencing system 133 can provision the adoption rule 144 to adopt the first set of security group rules 134 in the second version 156 of the application 152 by adding the first set of security group rules 134 to the second version 156 of the application 152. As a result, execution of the second version 156 of the application 152 can trigger the first set of security group rules 134 but not the second set of security group rules 136.

In several embodiments, the security group differencing data 138 can indicate that the second version 156 of the application 152 has removed access to a security group that was included in the first version 154 of the application 152. The security group differencing system 133 can determine whether the access was used by the first version 154 of the application 152 within a predetermined amount of time (e.g., in the last 30 days, 60 days, 90 days, 180 days, 365 days, 1.5 years, 2 years, ever, etc.). In response to a determination that the access was not used by the first version 154 of the application 152 within the predetermined amount of time, the security group differencing system 133 can provision the adoption rule 144 to adopt the second set of security group rules 136 in the second version 156 of the application 152. Alternatively, in response to a determination that the access was used by the first version 154 of the application 152 within the predetermined amount of time, the security group differencing system 133 can provision the adoption rule 144 to: block the second set of security group rules 136 in the second version 156 of the application 152; and adopt the first set of security group rules 134 in the second version 156 of the application 152.

In some aspects, system 100 significantly improves the state of the art from previous systems because it provides enhanced techniques for performing security group differencing for applications stored in a cloud-based computing environment. As a result, system 100 can reduce significant time in analysis or testing to determine what access is needed based on the difference between current and new application versions. Additionally, the system 100 can decrease error and mitigate the risks of loss of access and application outages. Further still, the system 100 can help verify the fidelity of access rules when migrating, porting, or copying a version of an application to an alternate or new account or VPC to ensure continuity of access.

Methods of Operation

Figure 2A:
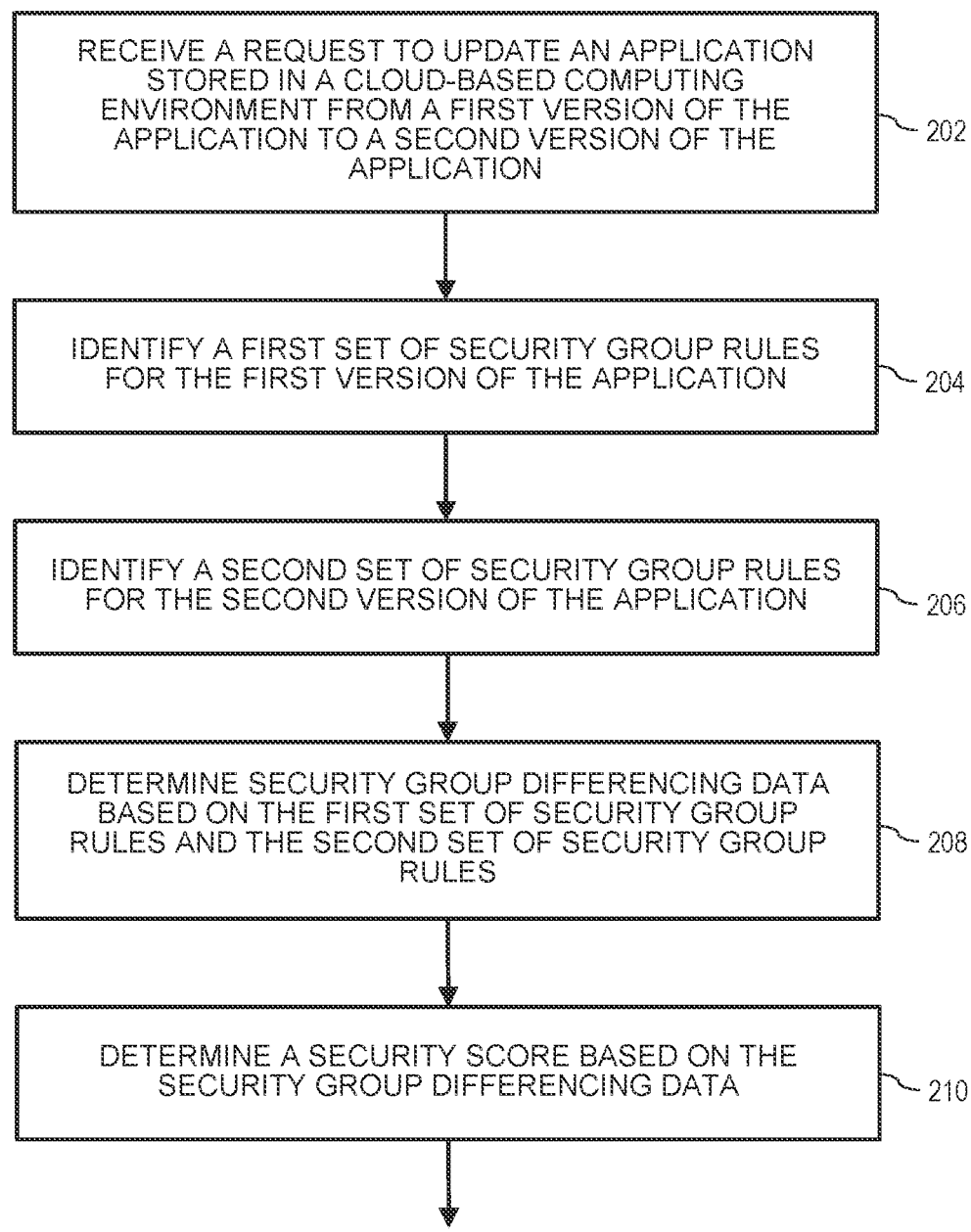
FIGS. 2A and 2B illustrate an example method for providing security group differencing for applications stored in a cloud-based computing environment, according to some embodiments.
Figure 2B:
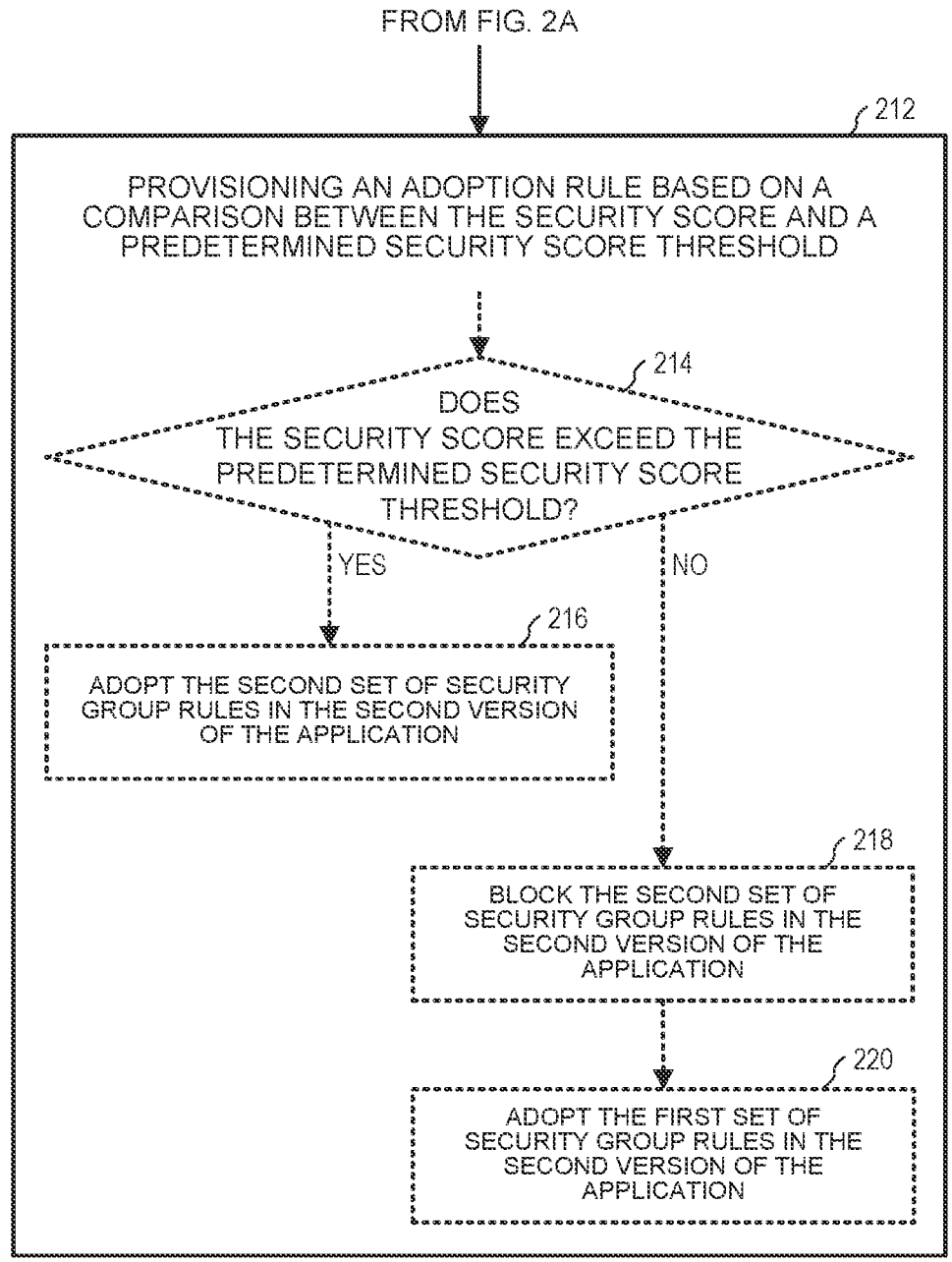

FIGS. 2A and 2B illustrate an example method 200 of operating the system 100 to provide for providing security group differencing for applications stored in a cloud-based computing environment, according to some embodiments. For example, method 200 indicates how the cloud server 130 operates (e.g., utilizing the security group differencing system 133).

As shown in FIG. 2A, in several embodiments, in operation 202 the cloud server 130 can receive, from the client device 110, a request 116 to update an application 152 stored in a cloud-based computing environment (e.g., in the application database 150) from a first version 154 of the application 152 to a second version 156 of the application 152.

In several embodiments, in operation 204 the cloud server 130 can identify a first set of security group rules 134 for (e.g., included in) the first version 154 of the application 152. For example, the cloud server 130 can identify the first set of security group rules 134 by identifying the outbound (egress) and inbound (ingress) access, port ranges to each destination and from each source, and source and destination IP address blocks included in the first version 154 of the application 152. The first set of security group rules 134 can include, for example, a first set of outbound (egress) access, inbound (ingress) access, destination port ranges (e.g., port ranges to each destination), source port ranges (e.g., port ranges from each source), destination IP address blocks, and source IP address blocks included in the first version 154 of the application 152.

In several embodiments, in operation 206 the cloud server 130 can identify a second set of security group rules 136 for (e.g., included in) the second version 156 of the application 152. For example, the cloud server 130 can identify the second set of security group rules 136 by identifying the outbound (egress) and inbound (ingress) access, port ranges to each destination and from each source, and source and destination IP address blocks included in the second version 156 of the application 152. The second set of security group rules 136 can include, for example, a second set of outbound (egress) access, inbound (ingress) access, destination port ranges (e.g., port ranges to each destination), source port ranges (e.g., port ranges from each source), destination IP address blocks, and source IP address blocks included in the second version 156 of the application 152.

In several embodiments, in operation 208 the cloud server 130 can determine security group differencing data 138 based on the first set of security group rules and the second set of security group rules. The security group differencing data 138 can include electronic information indicative of the access changed between the first version 154 of the application 152 and the second version 156 of the application 152, including, but not limited to, the ports added, the ports removed, the IP address ranges added, the IP address ranges removed, the expansion of access, the contraction of access, the size of the IP address change, any other suitable electronic information, or any combination thereof. In several embodiments, in one or more operations the cloud server 130 can generate, based on the security group differencing data 138, a security group difference report showing the access changed between the first version 154 of the application 152 and the second version 156 of the application 152, such as one of the example security group difference reports described above with reference to FIG. 1.

In one illustrative and non-limiting example, the cloud server 130 can determine security group differencing data 138 by accessing the rules of each security group (e.g., whether two versions of a security group, or two different security groups) and processing all of the rules contained within each security group into internal data structures that organize the information by access type (e.g., inbound (ingress), or outbound (egress)), protocol, and then port ranges and IP address blocks (e.g., also referred to as CIDR blocks). The cloud server 130 can then generate comparisons on the inbound rules by port to determine the security group differencing data 138 based on the generated comparisons.

In another illustrative and non-limiting example, the cloud server 130 can determine security group differencing data 138 by detecting, for example, added IP addresses, removed IP addresses, widened (e.g., expanded) IP address blocks, and/or contracted (e.g., reduced) IP address blocks in the second set of security group rules 136 as compared to the first set of security group rules 134, even in the middle of an IP address range.

In yet another illustrative and non-limiting example, the cloud server 130 can determine security group differencing data 138 by detecting egress changes (e.g., new destinations and removed outbound access), ingress changes (e.g., new sources and removed inbound access), port changes (e.g., added ports, removed ports, and combinations thereof), and IP range changes (e.g., adding, removing, expanding, or contracting CIDR ranges) in the second set of security group rules 136 as compared to the first set of security group rules 134. For example, the first version 154 of the application 152 can include the first security group "tcp 8080-8090 to [10.20.0.0/24]," the second version 156 of the application 152 can include the second security group "tcp 8088-8100 to [10.20.0.0/24]," and the security group differencing data 138 can include data indicating that the second security group removed [8080-8087] and added [8091-8100] to the destination. In another example, the first version 154 of the application 152 can include the first security group "tcp 8080 [10.20.0.0/22]," the second version 156 of the application 152 can include the second security group "tcp 8080 [10.20.0.0/24]," and the security group differencing data 138 can include data indicating that the second security group changed the size of the IP address range by 768 IP addresses.

In several embodiments, in operation 210 the cloud server 130 can determine a security score 140 based on the security group differencing data 138. The security score 140 can include, for example, a numerical value (e.g., between 0.0 and 1.0) indicative of a risk of adopting any detected egress changes, ingress changes, port changes, and IP range changes between the first set of security group rules and the second set of security group rules. For example, when no access (e.g., ingress, egress, or both) has been removed or added, the security score 140 can include a numerical value of 0.0 indicating that there is substantially no risk in upgrading the application 152 from the first version 154 to the second version 156. In another example, when only access (e.g., ingress, egress, or both) has been added, or only access (e.g., ingress, egress, or both) that has not used within a predetermined amount of time (e.g., 30 days or since the release of the first version 154 of the application 152) has been removed, the security score 140 can include a numerical value of 0.3 indicating that there is substantially little risk in upgrading the application 152 from the first version 154 to the second version 156. In yet another example, when access (e.g., ingress, egress, or both) that has been used within a predetermined amount of time (e.g., 30 days or since the release of the first version 154 of the application 152) has been removed, the security score 140 can include a numerical value of 0.7 indicating that there is substantially great risk in upgrading the application 152 from the first version 154 to the second version 156.

As shown in FIG. 2B, in several embodiments, in operation 212 the cloud server 130 can provision an adoption rule 144 based on a comparison between the security score 140 and a predetermined security score threshold 142. In several embodiments, the cloud server 130 can provision the adoption rule 144 according to one or more operations, such as operations 214, 216, 218, and 220.

In several embodiments, in operation 214 the cloud server 130 can determine whether the security score 140 exceeds the predetermined security score threshold 142. For example, the cloud server 130 can determine that a security score 140 having a numerical value of 1.0 or 0.7 exceeds a predetermined security score threshold 142 having a numerical value of 0.5. In another example, the cloud server 130 can determine that a security score 140 having a numerical value of 0.3 does not exceed a predetermined security score threshold 142 having a numerical value of 0.5.

In several embodiments, in response to determining that the security score 140 exceeds the predetermined security score threshold 142, the method 200 proceeds to operation 216. In several embodiments, in operation 216 the cloud server 130 can adopt, based on the adoption rule 144, the second set of security group rules 136 in the second version 156 of the application 152 when the security score 140 (e.g., 1.0, 0.7) exceeds the predetermined security score threshold 142 (0.5).

In several embodiments, in response to determining that the security score 140 does not exceed the predetermined security score threshold 142, the method 200 proceeds to operation 218. In several embodiments, in operation 218 the cloud server 130 can block, based on the adoption rule 144, the second set of security group rules 136 in the second version 156 of the application 152 when the security score 140 (e.g., 0.3) does not exceed the predetermined security score threshold 142 (e.g., 0.5). In another example, the cloud server 130 may modify the second version 156 of the application 152 to block the second set of security group rules 136 by deleting the second set of security group rules 136 from the second version 156 of the application 152. In another example, the cloud server 130 may modify the second version 156 of the application 152 to block the second set of security group rules 136 by disabling (e.g., commenting out or otherwise rendering inert) the second set of security group rules 136 in the second version 156 of the application 152. The cloud server 130 may disable the second set of security group rules 136 by, for example, surrounding each of the second set of security group rules 136 with comment-start and comment-stop characters (e.g., //, /*, */, #, etc.) to prevent the second set of security group rules 136 from being compiled or interpreted during execution of the second version 156 of the application 152.

In several embodiments, in operation 220 the cloud server 130 can adopt, based on the adoption rule 144, the first set of security group rules 134 in the second version 156 of the application 152. For example, the cloud server 130 may modify the second version 156 of the application 152 to adopt the first set of security group rules 134 by replacing the blocked second set of security group rules 136 in the second version 156 of the application 152 with the first set of security group rules 134. In another example, the cloud server 130 may modify the second version 156 of the application 152 to adopt the first set of security group rules 134 by adding the first set of security group rules 134 to the second version 156 of the application 152. As a result, the second version 156 of the application 152 may include the first set of security group rules 134 but not the second set of security group rules 136.

In several embodiments, the security group differencing data 138 can indicate that the second version 156 of the application 152 has removed access to a security group that was included in the first version 154 of the application 152. In addition to, instead of, or as a part of operation 214, in one or more operations the cloud server 130 can determine whether the access was used by the first version 154 of the application 152 within a predetermined amount of time. In several embodiments, in response to a determination that the access was not used by the first version 154 of the application 152 within the predetermined amount of time, in operation 216 the cloud server 130 can adopt, based on the adoption rule 144, the second set of security group rules 136 in the second version 156 of the application 152. In several embodiments, in response to a determination that the access was used by the first version 154 of the application 152 within the predetermined amount of time, in operation 218 the cloud server 130 can block, based on the adoption rule 144, the second set of security group rules 136 in the second version 156 of the application 152. Subsequently, in operation 220 the cloud server 130 can adopt, based on the adoption rule 144, the first set of security group rules 134 in the second version 156 of the application 152.

In several embodiments, in one or more operations the cloud server 130 can identify a set of common security group rules for the first version 154 of the application 152 and the second version 156 of the application 152. In one or more operations the cloud server 130 can generate a modified first set of security group rules by removing the set of common security group rules from the first set of security group rules 134. In one or more operations the cloud server 130 can generate a modified second set of security group rules by removing the set of common security group rules from the second set of security group rules 136. In one or more operations the cloud server 130 can determine the security group differencing data 138 based on the modified first set of security group rules and the modified second set of security group rules.

Components of the System

Figure 3:
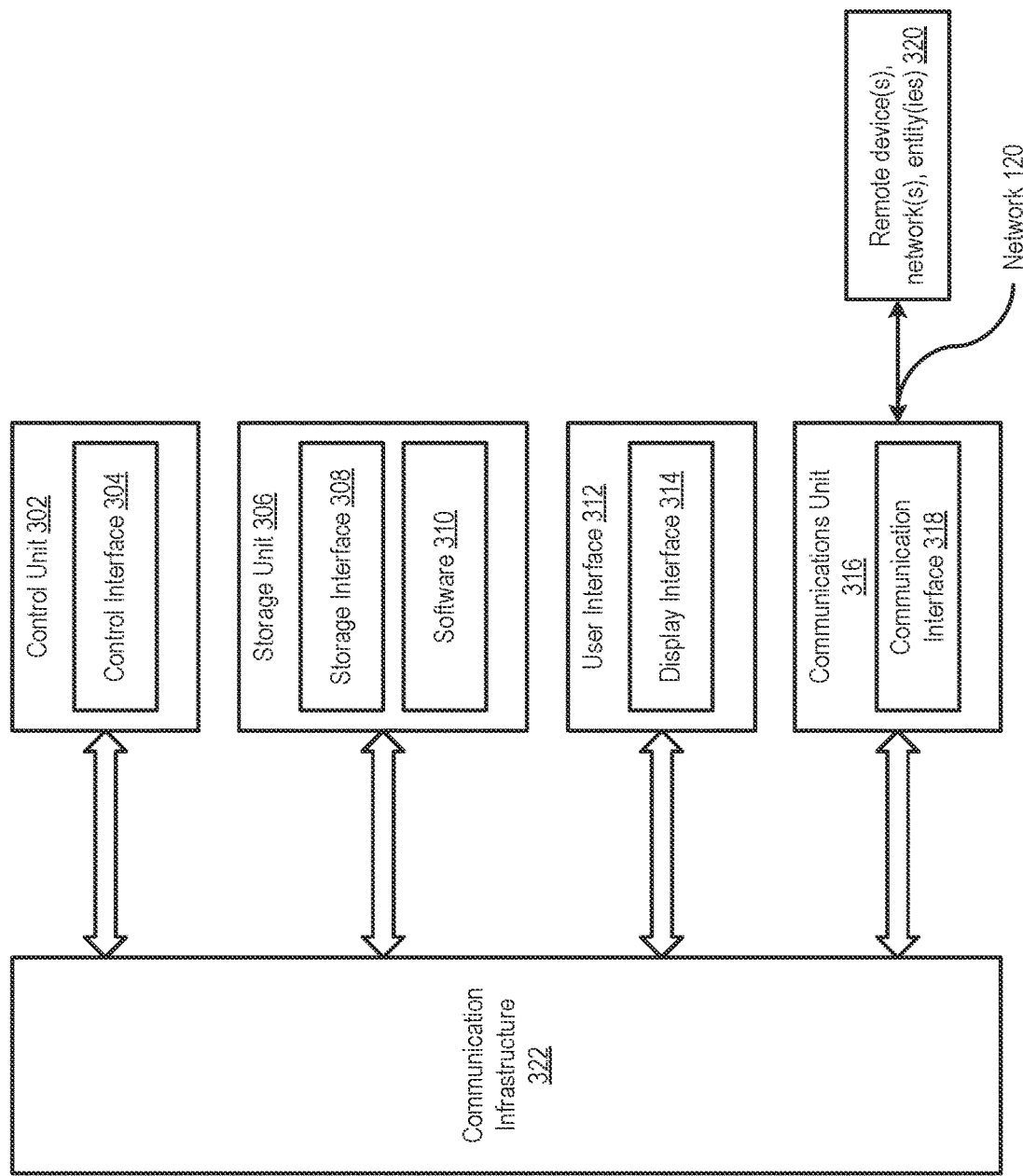
FIG. 3 is an example architecture of components implementing an example system for providing security group differencing for applications stored in a cloud-based computing environment, according to some embodiments.

FIG. 3 is an example architecture 300 of components implementing the system 100 according to some embodiments. The components may be implemented by any of the devices described with reference to the system 100, such as the client device 110, the client device 160, the cloud server 130, the application database 150, or a combination thereof.

The components may be further implemented by any of the devices described with reference to the method 200.

In several embodiments, the components may include a control unit 302, a storage unit 306, a communication unit 316, and a user interface 312. The control unit 302 may include a control interface 304. The control unit 302 may execute a software 310 (e.g., the application 112, the authentication module 114, the application 162, the authentication module 164, the authentication service 132, the security group differencing system 133, or a combination thereof) to provide some or all of the machine intelligence described with reference to system 100. In another example, the control unit 302 may execute a software 310 to provide some or all of the machine intelligence described with reference to method 200.

The control unit 302 may be implemented in a number of different ways. For example, the control unit 302 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 304 may be used for communication between the control unit 302 and other functional units or devices of system 100 (e.g., the client device 110, the client device 160, the cloud server 130, the application database 150, or a combination thereof) or those described with reference to method 200. The control interface 304 may also be used for communication that is external to the functional units or devices of system 100 or those described with reference to method 200. The control interface 304 may receive information from the functional units or devices of system 100 or method 200, or from remote devices 320, or may transmit information to the functional units or devices of system 100 or method 200, or to remote devices 320. The remote devices 320 refer to units or devices external to system 100 or method 200.

The control interface 304 may be implemented in different ways and may include different implementations depending on which functional units or devices of system 100, method 200, or remote devices 320 are being interfaced with the control unit 302. For example, the control interface 304 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 304 may be connected to a communication infrastructure 322, such as a bus, to interface with the functional units or devices of system 100, method 200, or remote devices 320.

The storage unit 306 may store the software 310. For illustrative purposes, the storage unit 306 is shown as a single element, although it is understood that the storage unit 306 may be a distribution of storage elements. Also for illustrative purposes, the storage unit 306 is shown as a single hierarchy storage system, although it is understood that the storage unit 306 may be in a different configuration. For example, the storage unit 306 may be formed with different storage technologies forming a memory hierarchical system including different levels of caching, main memory, rotating media, or off-line storage. The storage unit 306 may be a volatile memory, a nonvolatile memory, an internal memory, an external memory, or a combination thereof. For example, the storage unit 306 may be a nonvolatile storage such as nonvolatile random access memory (NVRAM), Flash memory, disk storage, or a volatile storage such as static random access memory (SRAM) or dynamic random access memory (DRAM).

The storage unit 306 may include a storage interface 308. The storage interface 308 may be used for communication between the storage unit 306 and other functional units or devices of system 100 or method 200. The storage interface 308 may also be used for communication that is external to system 100 or method 200. The storage interface 308 may receive information from the other functional units or devices of system 100, method 200, or from remote devices 320, or may transmit information to the other functional units or devices of system 100 or to remote devices 320. The storage interface 308 may include different implementations depending on which functional units or devices of system 100, method 200, or remote devices 320 are being interfaced with the storage unit 306. The storage interface 308 may be implemented with technologies and techniques similar to the implementation of the control interface 304.

The communication unit 316 may enable communication to devices, components, modules, or units of system 100, method 200, or remote devices 320. For example, the communication unit 316 may permit the system 100 to communicate between the client device 110, the client device 160, the cloud server 130, the application database 150, or a combination thereof. In another example, the communication unit 316 may permit the functional units or devices described with reference to method 200 to communicate with each other. The communication unit 316 may further permit the devices of system 100 or method 200 to communicate with remote devices 320 such as an attachment, a peripheral device, or a combination thereof through the network 120.

As previously indicated, the network 120 may span and represent a variety of networks and network topologies. For example, the network 120 may include wireless communication, wired communication, optical communication, ultrasonic communication, or a combination thereof. For example, satellite communication, cellular communication, Bluetooth, IrDA, Wi-Fi, and WiMAX are examples of wireless communication that may be included in the network 120. Cable, Ethernet, DSL, fiber optic lines, FTTH, and POTS are examples of wired communication that may be included in the network 120. Further, the network 120 may traverse a number of network topologies and distances. For example, the network 120 may include direct connection, PAN, LAN, MAN, WAN, or a combination thereof.

The communication unit 316 may also function as a communication hub allowing system 100 to function as part of the network 120 and not be limited to be an end point or terminal unit to the network 120. The communication unit 316 may include active and passive components, such as microelectronics or an antenna, for interaction with the network 120.

The communication unit 316 may include a communication interface 318. The communication interface 318 may be used for communication between the communication unit 316 and other functional units or devices of system 100 or to remote devices 320. The communication interface 318 may receive information from the other functional units or devices of system 100, or from remote devices 320, or may transmit information to the other functional units or devices of the system 100 or to remote devices 320. The communication interface 318 may include different implementations depending on which functional units or devices are being interfaced with the communication unit 316. The communication interface 318 may be implemented with technologies and techniques similar to the implementation of the control interface 304.

The user interface 312 may present information generated by system 100. In several embodiments, a user can utilize the user interface 312 to interface with the devices of system 100 or remote devices 320. The user interface 312 may include an input device and an output device. Examples of the input device of the user interface 312 may include a keypad, buttons, switches, touchpads, soft-keys, a keyboard, a mouse, or any combination thereof to provide data and communication inputs. Examples of the output device may include a display interface 314. The control unit 302 may operate the user interface 312 to present information generated by system 100. The control unit 302 may also execute the software 310 to present information generated by system 100, or to control other functional units of system 100. The display interface 314 may be any graphical user interface such as a display, a projector, a video screen, or any combination thereof.

The above detailed description and embodiments of the disclosed system 100 are not intended to be exhaustive or to limit the disclosed system 100 to the precise form disclosed above. While specific examples for system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The system 100 and the method 200 are cost-effective, highly versatile, and accurate, and may be implemented by adapting components for ready, efficient, and economical manufacturing, application, and utilization. Another important aspect of embodiments of the present disclosure is that they valuably support and service the trend of reducing costs, simplifying systems, and/or increasing system performance.

These and other valuable aspects of the embodiments of the present disclosure consequently further the state of the technology to at least the next level. While the disclosed embodiments have been described as the best mode of implementing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the disclosure is not to be restricted except in light of the attached claims and their equivalents.

What is claimed is:

1. A computer-implemented method comprising:
   receiving, by one or more computing devices, a request to update an application stored in a cloud-based computing environment from a first version of the application to a second version of the application;
   identifying, by the one or more computing devices, a first set of security group rules for the first version of the application that comprises a first set of: outbound access, inbound access, destination port ranges, source port ranges, destination IP address blocks, and source IP address blocks;
   identifying, by the one or more computing devices, a second set of security group rules for the second version of the application that comprises a second set of: outbound access, inbound access, destination port ranges, source port ranges, destination IP address blocks, and source IP address blocks;
   determining, by the one or more computing devices, security group differencing data based on the first set of security group rules and the second set of security group rules;
   determining, by the one or more computing devices, a security score based on the security group differencing data; and
   provisioning, by the one or more computing devices, an adoption rule based on a comparison between the security score and a predetermined security score threshold.

2. The computer-implemented method of claim 1, wherein the provisioning comprises:
   in response to the security score exceeding the predetermined security score threshold, adopting, by the one or more computing devices, the second set of security group rules in the second version of the application.

3. The computer-implemented method of claim 1, wherein the provisioning comprises:
   in response to the security score being below the predetermined security score threshold, blocking, by the one or more computing devices, the second set of security group rules in the second version of the application; and
   adopting, by the one or more computing devices, the first set of security group rules in the second version of the application.

4. The computer-implemented method of claim 1, wherein:
   the security group differencing data indicates that the second version of the application has removed access to a security group; and
   the provisioning comprises:
      determining, by the one or more computing devices, whether the access was used by the first version of the application within a predetermined amount of time.

5. The computer-implemented method of claim 4, wherein the provisioning further comprises:
   in response to determining that the access was not used by the first version of the application within the predetermined amount of time, adopting, by the one or more computing devices, the second set of security group rules in the second version of the application.

6. The computer-implemented method of claim 4, wherein the provisioning further comprises:
   in response to determining that the access was used by the first version of the application within the predetermined amount of time, blocking, by the one or more computing devices, the second set of security group rules in the second version of the application; and
   adopting, by the one or more computing devices, the first set of security group rules in the second version of the application.

7. The computer-implemented method of claim 1, further comprising:
identifying, by the one or more computing devices, a set of common security group rules for the first version of the application and the second version of the application;
generating, by the one or more computing devices, a modified first set of security group rules by removing the set of common security group rules from the first set of security group rules;
generating, by the one or more computing devices, a modified second set of security group rules by removing the set of common security group rules from the second set of security group rules; and
determining, by the one or more computing devices, the security group differencing data based on the modified first set of security group rules and the modified second set of security group rules.

8. The computer-implemented method of claim 1, wherein the determining the security group differencing data comprises:
detecting, by the one or more computing devices, egress changes, ingress changes, port changes, and IP range changes between the first set of security group rules and the second set of security group rules.

9. The computer-implemented method of claim 8, wherein the security score comprises a numerical value indicative of a risk of adopting the detected egress changes, ingress changes, port changes, and IP range changes between the first set of security group rules and the second set of security group rules.

10. A non-transitory computer-readable medium having instructions stored thereon that, when executed by at least one computing device, cause the at least one computing device to perform operations comprising:
receiving a request to update an application stored in a cloud-based computing environment from a first version of the application to a second version of the application;
identifying a first set of security group rules for the first version of the application that comprises a first set of: outbound access, inbound access, destination port ranges, source port ranges, destination IP address blocks, and source IP address blocks;
identifying a second set of security group rules for the second version of the application;
determining security group differencing data based on the first set of security group rules and the second set of security group rules;
determining a security score based on the security group differencing data; and
provisioning an adoption rule based on a comparison between the security score and a predetermined security score threshold.

11. The non-transitory computer-readable medium of claim 10, wherein to perform the provisioning, the operations further comprise:
in response to the security score exceeding the predetermined security score threshold, adopting the second set of security group rules in the second version of the application.

12. The non-transitory computer-readable medium of claim 10, wherein to perform the provisioning, the operations further comprise:
in response to the security score being below the predetermined security score threshold, blocking the second set of security group rules in the second version of the application; and
adopting the first set of security group rules in the second version of the application.

13. The non-transitory computer-readable medium of claim 10, wherein:
the security group differencing data indicates that the second version of the application has removed access to a security group; and
to perform the provisioning, the operations further comprise:
determining whether the access was used by the first version of the application within a predetermined amount of time.

14. The non-transitory computer-readable medium of claim 13, wherein to perform the provisioning, the operations further comprise:
in response to determining that the access was not used by the first version of the application within the predetermined amount of time, adopting the second set of security group rules in the second version of the application.

15. A computing system comprising:
a memory; and
at least one processor coupled to the memory and configured to perform operations comprising:
receiving a request to update an application stored in a cloud-based computing environment from a first version of the application to a second version of the application;
identifying a first set of security group rules for the first version of the application that comprises a first set of: outbound access, inbound access, destination port ranges, source port ranges, destination IP address blocks, and source IP address blocks;
identifying a second set of security group rules for the second version of the application that comprises a second set of: outbound access, inbound access, destination port ranges, source port ranges, destination IP address blocks, and source IP address blocks;
determining security group differencing data based on the first set of security group rules and the second set of security group rules;
determining a security score based on the security group differencing data; and
provisioning an adoption rule based on a comparison between the security score and a predetermined security score threshold.

16. The computing system of claim 15, wherein to provision, the operations further comprise:
in response to the security score exceeding the predetermined security score threshold, adopting the second set of security group rules in the second version of the application.

17. The computing system of claim 15, wherein to provision, the operations further comprise:
in response to the security score being below the predetermined security score threshold, blocking the second set of security group rules in the second version of the application; and
adopting the first set of security group rules in the second version of the application.

18. The computing system of claim 15, wherein:
the security group differencing data indicates that the second version of the application has removed access to a security group; and
to provision, the operations further comprise:
determining whether the access was used by the first version of the application within a predetermined amount of time.

19. The computing system of claim 18, wherein to provision, the operations further comprise:
in response to a determination that the access was not used by the first version of the application within the predetermined amount of time, adopting the second set of security group rules in the second version of the application.

* * * * *